United States Patent Office 3,095,447
Patented June 25, 1963

3,095,447
N-SUBSTITUTED N-ARYL SULPHONYL UREAS
Willy Stoll and Henri Dietrich, Basel, Switzerland, assignors to Geigy Chemical Corporation, Yonkers, N.Y., a corporation of Delaware
No Drawing. Filed July 22, 1957, Ser. No. 673,139
Claims priority, application Switzerland July 27, 1956
5 Claims. (Cl. 260—553)

The present invention concerns new N'-substituted N-aryl sulphonyl ureas which have valuable pharmacological properties as well as the processes for the production thereof.

N-sulphanilyl-N'-n-butyl urea and N-(4-methyl benzene sulphonyl)-N'-n-butyl urea have been extensively tested clinically as hypoglycaemic agents and have proved suitable for the peroral treatment of diabetes mellitus. These compounds have already been put to practical use.

Surprisingly it has now been found that N'-substituted N-aryl sulphonyl ureas of the general formula:

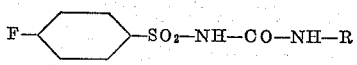
                                                                  I wherein R represents an alkyl, alkenyl or cycloalkyl radical, cause a reduction of the blood sugar level corresponding to that of the known compounds even in considerably smaller doses and, in addition, are distinguished by an unvarying, long lasting action. Therefore they can also be used for the peroral treatment of diabetes mellitus.

The compounds defined above can be produced by reacting p-fluoro-benzene sulphonamide or an alkali salt thereof with an alkyl, alkenyl or cycloalkyl isocyanate of the general formula:

$$R-N=C=O \qquad \qquad II$$

or with a reactive functional derivative of an alkyl, alkenyl or cycloalkyl carbamic acid of the general formula:

$$R-NH-COOH \qquad \qquad III$$

the reaction being performed if necessary in the presence of a condensing agent, and, in the case of the N'-substituted N-(p-fluoro-benzene sulphonyl)-guanidine being obtained, partially hydrolysing it to form the corresponding urea. Suitable functional derivatives of carbamic acids are, in particular, the esters thereof, e.g. low molecular alkyl esters, or the halides thereof as well as the amides, i.e. ureas of the formula R—NH—CO—NH$_2$, and the nitriles, i.e. cyanamides of the formula R—NH—CN. When these latter compounds are used, the guanidines mentioned above are obtained. Instead of isocyanates, also azides, N-bromo-amides and N-chloro-amides of carboxylic acids of the formula R—COOH which can easily be decomposed into such isocyanates can be used.

The compounds defined above can also be produced by reacting possibly in the presence of a condensing agent, an alkyl, alkenyl, or cycloalkylamine of the general formula:

$$R-NH_2 \qquad \qquad IV$$

wherein R has the meaning given above with p-fluoro-benzene sulphonyl isocyanate or with a reactive functional derivative of the p-fluoro-benzene sulphonyl carbamic acid and, if an N'-substituted N-(p-fluoro-benzene sulphonyl)-guanidine is obtained, partially hydrolysing it to form the corresponding urea. By reactive functional derivatives of the carbamic acid named are meant here, in particular, the esters thereof, e.g. low molecular alkyl esters, or the halides thereof, e.g. chlorides, as well as the amide and the nitrile, i.e. N-p-fluoro-benzene sulphonyl urea and N-p-fluoro-benzene sulphonyl cyanamide. On reacting the last named compound with amines, the guanidines mentioned above are obtained. Finally, the new N'-substituted N-p-fluoro-benzene sulphonyl ureas can also be produced by reacting aryl sulpho-halides of the general formula:

                                                                  V wherein X represents chlorine or bromine, with an ether of the isoform of an alkyl, alkenyl or cycloalkyl urea, in particular with a methyl or ethyl ether, and then partially hydrolysing the N'-substituted N-p-fluoro-benzene sulphonyl iso-urea ether so obtained, in particular with hydrochloric acid, to form the corresponding urea.

Basic condensing agents such as, e.g. alkali alcoholates, pyridine or triethylamine can be used as condensing agents for the first named process in particular and also for the second process. They are used in particular when the reaction proceeds under liberation of an acid. In the first process, the p-fluoro-benzene sulphonamide can be converted into an alkali salt by treatment with an alkali compound before the reaction, and the preformed alkali salts of the free sulphonamide can be used instead of the free sulphonamide itself in the presence of a basic condensing agent. On the other hand, when reacting p-fluoro-benzene sulphonamide or amines with alkyl, alkenyl or cycloalkyl cyanamides or with p-fluoro-benzene sulphonyl cyanamide respectively, in particular hydrogen chloride is used as condensing agent.

The 4-fluoro-benzene sulphonamide can be reacted for example with methyl, ethyl, n-propyl, isopropyl, n-butyl, isobutyl, sec. butyl, n-amyl, isoamyl-, n-hexyl, β-methyl-pentyl, n-octyl, β-ethyl-hexyl, allyl, crotyl, methallyl, cyclopentyl and cyclohexyl isocyanate. Examples of amines suitable for use in the second process named are methyl, ethyl, n-propyl, isopropyl, n-butyl, isobutyl, sec. butyl, n-amyl, isoamyl, n-hexyl, β-methyl-pentyl, n-octyl, β-ethyl-hexyl, allyl, crotyl, methallyl, cyclopentyl, cyclohexyl and endomethylene cyclohexylmethyl amine. The carbamic acid derivatives derived from these amines can be used in the first named process instead of the isocyanates of the general Formula II.

The compounds of the general Formula I according to the present invention can be converted in the usual manner into stable, water soluble alkali salts.

The following examples further illustrate the production of the new N'-substituted N-p-fluoro-benzene sulphonyl ureas. Parts are given as parts by weight and their relationship to parts by volume is as that of grammes to cubic centimetres. The temperatures are in degrees centigrade.

Example 1

17.5 parts of p-fluoro-benzene sulphonamide are dissolved in 50 parts by volume of acetone and converted into the sodium salt by the addition of 20 parts by volume of 5 N-caustic soda lye. 10 parts of n-butyl isocyanate are then added while stirring. On completion of the exothermic reaction, the mixture is refluxed for another 2 hours. The acetone is then evaporated off under reduced pressure, water is added to the residue and a little insoluble side product is filtered off. N-(p-fluoro-benzene sulphonyl)-N'-n-butyl urea is precipitated by acidifying the filtrate with diluted hydrochloric acid while stirring. Recrystallised from alcohol, the pure substance melts at 98–100°.

It is also possible to use previously formed sodium salt of p-fluoro-benzene sulphonamide (19.7 parts) or also to produce it with sodium carbonate instead of with caustic soda lye. In addition, the potassium salt of the sulphonamide is suitable as starting material.

Instead of acetone-water, alcohol and water can be used as solvent mixture. The reaction can also be performed however in an anhydrous medium, e.g. in alcohol, acetone, benzene or nitrobenzene.

Example 2

23.3 parts of N-(p-fluoro-benzene sulphonyl)-carbamic acid methyl ester are refluxed for 4 hours with 8 parts of isobutylamine in 50 parts by volume of glycol monomethyl ether. The reaction mixture is then concentrated in the vacuum, the residue is dissolved in diluted aqueous ammonia, filtered, the filtrate is de-coloured with animal charcoal and the reaction product is precipitated therefrom by acidifying with diluted hydrochloric acid.

After recrystallising from 120 parts by volume of benzene, N-(p-fluoro-benzene sulphonyl)-N'-isobutyl urea is obtained as white needles which melt 152.5–154.5°.

Example 3

8 parts of sec. butylamine dissolved in 10 parts by volume of toluene are added while stirring well and cooling to 10–20° to a solution of 20.1 parts of p-fluoro-benzene sulphonyl isocyanate in 100 parts by volume of abs. toluene. On completion of the reaction the whole is refluxed for another 3 hours and then the solvent is drawn off under suction in the vacuum. The residue is dissolved in diluted aqueous ammonia, filtered and de-coloured with animal charcoal. N-(p-fluoro-benzene sulphonyl)-N'-sec. butyl area is then precipitated therefrom by means of diluted hydrochloric acid. Recrystallised from alcohol, the substance crystallises into colourless needles which melt at 129–131°.

The following compounds are obtained for example in a manner analogous to that described in the above examples:

N-(p-fluoro-benzene sulphonyl)-N'-ethyl urea, M.P. 112–114.5°,

N-(p-fluoro-benzene sulphonyl)-N'-n-propyl urea, M.P. 129–130°,

N-(p-fluoro-benzene sulphonyl)-N'-isopropyl urea, M.P. 140–142°,

N-(p-fluoro-benzene sulphonyl)-N'-allyl urea, M. P. 160–162°, and

N-(p-fluoro-benzene sulphonyl)-N'-cyclohexyl urea, M.P. 145.5–147°.

What we claim is:

1. A compound of the formula:

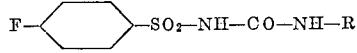

wherein R stands for lower alkyl.

2. The compound of the formula:

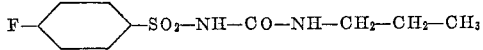

3. The compound of the formula:

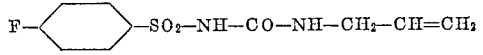

4. N-(p-fluoro-benzene sulphonyl)-N'-cyclohexyl urea.

5. N-n-butyl-N'-4-fluorobenzenesulfonylurea.

References Cited in the file of this patent

FOREIGN PATENTS

| | | |
|---|---|---|
| 993,465 | France | July 25, 1951 |
| 71,236 | Norway | Nov. 4, 1946 |
| 61,524 | Denmark | Nov. 8, 1943 |

OTHER REFERENCES

Petersen: Chem. Berichte, vol. 83, pp. 551–7 (1950).
Germany, F 18659, printed Dec. 27, 1956.